(12) United States Patent
Caldwell et al.

(10) Patent No.: US 9,749,866 B2
(45) Date of Patent: Aug. 29, 2017

(54) VEHICLE SAFETY SYSTEM AND METHOD

(71) Applicant: Centric Consulting, LLC, Dayton, OH (US)

(72) Inventors: Chad Caldwell, Granville, OH (US); Chris Martinez, Lake Worth, FL (US); John Kessler, Johnstown, OH (US); Michael McKinney, Columbus, OH (US)

(73) Assignee: Centric Consulting, LLC, Dayton, OH (US)

( * ) Notice: Subject to any disclaimer, the term of this patent is extended or adjusted under 35 U.S.C. 154(b) by 0 days.

(21) Appl. No.: 15/355,999

(22) Filed: Nov. 18, 2016

(65) Prior Publication Data
US 2017/0150360 A1    May 25, 2017

Related U.S. Application Data

(60) Provisional application No. 62/257,773, filed on Nov. 20, 2015.

(51) Int. Cl.
| | |
|---|---|
| *H04M 1/66* | (2006.01) |
| *H04M 1/68* | (2006.01) |
| *H04M 3/16* | (2006.01) |
| *H04W 12/08* | (2009.01) |
| *H04W 4/02* | (2009.01) |
| *H04W 4/00* | (2009.01) |

(52) U.S. Cl.
CPC .......... *H04W 12/08* (2013.01); *H04W 4/008* (2013.01); *H04W 4/023* (2013.01); *H04W 4/027* (2013.01)

(58) Field of Classification Search
CPC ..... H04W 12/08; H04W 4/008; H04W 4/027; H04W 4/023
See application file for complete search history.

(56) References Cited

U.S. PATENT DOCUMENTS

| | | | |
|---|---|---|---|
| 8,527,013 B2 | 9/2013 | Guba et al. | |
| 8,803,677 B1 | 8/2014 | Miller | |
| 2012/0071151 A1* | 3/2012 | Abramson | H04L 67/12 455/418 |
| 2013/0150004 A1* | 6/2013 | Rosen | H04W 8/22 455/414.1 |

(Continued)

*Primary Examiner* — Ajit Patel
(74) *Attorney, Agent, or Firm* — Taft Stettinius & Hollister, LLP; Anthony P. Filomena, II (57) ABSTRACT

A vehicle safety system and method for controlling usage of mobile devices in a vehicle is disclosed that includes determining mobile device location in the vehicle; determining vehicle movement; determining whether device is being used by the driver based on device location; and monitoring or limiting usage of the device based on whether its being used by the driver while the vehicle is moving. An electronic beacon located in the vehicle can be used in determining device location. The method can include monitoring activation and usage of device functionality; maintaining an enforcement list of functionality to be limited when used by the driver; determining if any functionality on the enforcement list is attempting to activate, and if so limiting or disabling activation of that functionality. The method can include generating a device motion/usage profile for the driver while driving, and scoring the driver based on the device motion/usage profile.

20 Claims, 5 Drawing Sheets

(56) References Cited

U.S. PATENT DOCUMENTS

| | | | |
|---|---|---|---|
| 2014/0335902 A1* | 11/2014 | Guba | H04W 4/027 |
| | | | 455/456.4 |
| 2015/0099480 A1* | 4/2015 | Reiter | H04M 1/72577 |
| | | | 455/404.1 |
| 2016/0174049 A1* | 6/2016 | Levy | G08G 1/0112 |
| | | | 455/456.5 |
| 2017/0019525 A1* | 1/2017 | Hannon | H04M 1/72577 |
| 2017/0144671 A1* | 5/2017 | Memani | B60W 40/09 |

* cited by examiner

VEHICLE SAFETY SYSTEM AND METHOD

FIELD OF THE DISCLOSURE

The present disclosure relates to safety systems and methods for a vehicle, and in particular to a system and method for determining if a driver of a vehicle is using an electronic device.

BACKGROUND

Driving while using an electronic device, for example a smartphone, is one of the leading causes of traffic accidents in the United States. The United States Department of Transportation notes that cell phones contribute to 1.6 million auto accidents each year which cause 500,000 injuries and take 6,000 lives. Many states require that electronic devices only be used in a hands-free mode while driving a vehicle, and have taken other steps to discourage use of electronic devices while driving a vehicle.

There are several approaches to solving the problem of detecting when an electronic device is being used in a vehicle. Some of these approaches are simplistic, for example assuming that if the device is moving above walking speed, then the device must be in a moving vehicle. These approaches use the GPS sensor on the device to determine the speed of the device. However, these approaches do not distinguish between the driver of the vehicle and the passenger(s), thereby providing inaccurate results at best. Other approaches attempt to solve the driver versus passenger dilemma by asking the user of the device a question that requires intense concentration. For the passenger, this is no problem at all. For the driver, answering a question that requires intense concentration violates the very reason for the vehicle safety system: preventing distracted driving of a vehicle. A few approaches use the accelerometer and gyroscope sensors to detect movement of the mobile device; but these approaches also cannot distinguish who is causing the movement of the mobile device: the driver or a passenger.

Prior solutions have attempted to solve the driver versus passenger identification problem by challenging the electronic device user with a simple "unlock" test. This approach works by placing a test on the device screen when the vehicle is in motion, such as a math problem. The theory is that solving the test requires the device user to focus on the screen. Unfortunately, this approach requires additional driver attention on the device screen to solve the test, which presents the unintended consequence of actually making the problem worse since solving the test requires the driver to focus on the test, further distracting the driver from actually driving the vehicle.

It would be desirable to have a system and method to perform one or more of the following: to determine if a driver of a vehicle was using an electronic device while the vehicle was moving, to distinguish between driver and passenger usage of the electronic device, and to disable certain features of the device for driver usage while the vehicle is moving.

SUMMARY

An electronic beacon, for example a Bluetooth beacon, can be used to locate an electronic device, for example a mobile device or cell phone, within a vehicle and to determine if the device is being used in hands free mode. Accelerometers, gyroscopes or other sensors in the electronic device or the vehicle can be used to determine if the electronic device is being used. Global Positioning System (GPS) or other sensors in the electronic device or the vehicle can be used to determine if the vehicle is moving. From this information, the system can determine if the driver is using an electronic device while the vehicle is moving. The system can distinguish driver mobile device usage from passenger mobile device usage.

In some embodiments, the system can disable certain features on the device when the system determines that the device is in a vehicle that is moving and the device is in close proximity to the driver. The device features that can be disabled can include, but are not limited to sending and receiving text messages, sending and receiving e-mails, accessing the Internet via Web browser, and placing and receiving telephone calls.

A vehicle safety system is disclosed that controls usage of a mobile device in a vehicle. The vehicle safety system includes an electronic beacon, a proximity sensor, a movement sensor and a processor. The electronic beacon is located in the vehicle, and the electronic beacon transmits a location signal. The proximity sensor generates device location data using the location signal. The device location data monitors the location of the mobile device in the vehicle. The movement sensor detects movement of the vehicle or the mobile device, and generates movement data. The processor receives the device location data and the movement data, determines whether the mobile device is being used by a driver of the vehicle using the device location data, and determines whether the vehicle is moving using the movement data. The processor monitors usage of the mobile device based on whether the mobile device is being used by the driver of the vehicle while the vehicle is moving. On some mobile platforms, the processor can also limit usage of the mobile device while the vehicle is moving.

The electronic beacon can be a Bluetooth beacon that transmits a Bluetooth signal, and the proximity sensor can be a Bluetooth component on the mobile device that detects the Bluetooth signal of the electronic beacon. The motion sensor can be a GPS sensor on the mobile device that detects movement of the mobile device. The electronic beacon can be located in the vehicle between a steering column and a driver-side doorjamb.

The vehicle safety system can also include a device usage monitor and an enforcement list of mobile device functionality. The device usage monitor detects functionality of the mobile device being used, and generates functionality data that indicates what functionality of the mobile device is currently being used. The enforcement list indicates mobile device functionality to be limited by the vehicle safety system when the mobile device is being used by the driver of the vehicle while the vehicle is moving. The processor can receive the functionality data, determine if any functionality of the mobile device currently being used is on the enforcement list, and if any functionality of the mobile device currently being used is on the enforcement list then the processor can limit that functionality of the mobile device according to the enforcement list.

The vehicle safety system can also include device motion sensors that detect motion of the mobile device in the vehicle, and that generate device motion data. The processor can receive the device motion data and determine whether the driver of the vehicle is moving the mobile device using the device location data and the device motion data. The processor can limit usage of the mobile device based on whether the mobile device is being used by the driver of the vehicle while the vehicle is moving and whether the driver of the vehicle is moving the mobile device while the vehicle is moving. The device motion sensors can be an accelerometer sensor and a gyroscope sensor on the mobile device.

The processor can determine a device motion/usage profile using the device motion data and the functionality data. At selected upload times, the processor can transmit the device location data, the movement data, the functionality data, the device motion data and the device motion/usage profile to a server.

A vehicle safety method for controlling usage of a mobile device in a vehicle is disclosed that includes generating device location data indicating the location of the mobile device in the vehicle; generating vehicle movement data indicating whether the vehicle is moving; determining whether the mobile device is being used by a driver of the vehicle based on the device location data; and limiting usage of the mobile device based on whether the mobile device is being used by the driver of the vehicle while the vehicle is moving.

Generating device location data and determining whether the mobile device is being used by the driver can include using a wireless receiver on the mobile device to receive a location signal from an electronic beacon located in the vehicle; determining a distance between the mobile device and the electronic beacon using the location signal; and determining whether the distance between the mobile device and the electronic beacon locates the mobile device at a driver's seat or at a passenger seat in the vehicle. Alternatively, generating device location data and determining whether the mobile device is being used by a driver of the vehicle can include using a wireless receiver on the mobile device to receive location signals from one or more electronic beacons located in the vehicle; determining a distance between the mobile device and each of the one or more electronic beacons using the location signals; determining a device location using the one or more distances between the mobile device and each of the one or more electronic beacons; and determining whether the device location locates the mobile device at a driver's seat or at a passenger seat in the vehicle.

The vehicle safety method can also include monitoring activation and usage of functionality of the mobile device; generating device functionality data indicating activation and usage of functionality of the mobile device; maintaining an enforcement list of mobile device functionality to be limited when the mobile device is being used by the driver of the vehicle while the vehicle is moving; determining if any functionality of the mobile device that is on the enforcement list is attempting to activate, and if any functionality of the mobile device on the enforcement list is attempting to activate, limiting or disabling activation of that functionality of the mobile device according to the enforcement list. In an embodiment where text messaging is on the enforcement list, the vehicle safety method can include allowing a user to edit a default response text message to be sent in response to any text message received by the user while the user is driving the vehicle and the vehicle is moving; detecting receipt of a text message on the mobile device of the user; and automatically sending the default response text message in response to the received text message received by the user if the user is driving the vehicle and the vehicle is moving.

The vehicle safety method can also include generating device motion data indicating motion of the mobile device in the vehicle; determining whether the driver of the vehicle is moving the mobile device; and generating a device motion/usage profile indicating usage of the mobile device by the driver based on the functionality data and the device motion data. Generating device motion data can include monitoring accelerometer outputs of an accelerometer sensor on the mobile device; monitoring gyroscope outputs of a gyroscope sensor on the mobile device; computing a gross movement vector based on the accelerometer outputs and the gyroscope outputs; and determining motion of the mobile device in the vehicle based on the difference between the gross movement vector and a minimum movement threshold.

The vehicle safety method can also include scoring the driver of the vehicle based on the device motion/usage profile while the driver is driving the vehicle. The vehicle safety method can also include uploading the device location data, the vehicle movement data, the functionality data, the device motion data and the device motion/usage profile to a server. The vehicle safety method can also include allowing an administrator to customize the enforcement list of mobile device functionality to be limited when the mobile device is being used by the driver of the vehicle while the vehicle is moving.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
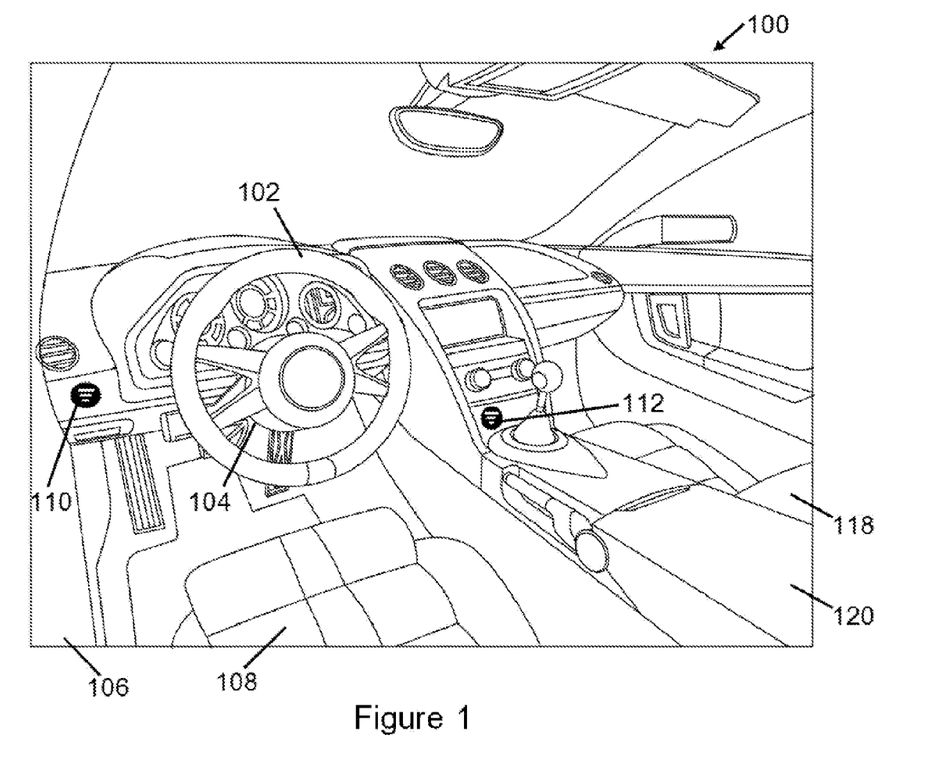
FIG. 1 shows an exemplary vehicle interior with one or more electronic beacons.

FIG. 1 shows the interior of an exemplary vehicle 100 with electronic beacons 110, 112. The interior of the vehicle 100 also includes a steering wheel 102, a steering column 104, a driver-side door jamb 106, a driver seat 108, a passenger seat 118 and a center console 120. One electronic beacon 110 is located in the interior of the vehicle 100 near the driver seat 108. In FIG. 1, the beacon 110 is located in front of the driver seat 108 between the steering column 104 and the driver-side door jamb 106. Placing the beacon 110 on the driver's side of the vehicle 100 in close proximity to the steering column 104 can help differentiate between driver and passenger usage of an electronic device. Additionally or alternatively, the electronic beacon 112 can be placed in the vehicle 100, for example near or on the center console 120 and the system could differentiate between driver and passenger usage of an electronic device based on distance and direction from the beacon 112. The locations of the one or more beacons 110, 112 shown in FIG. 1 are exemplary, and other locations can be selected in different system embodiments and vehicle layouts.

Figure 2:
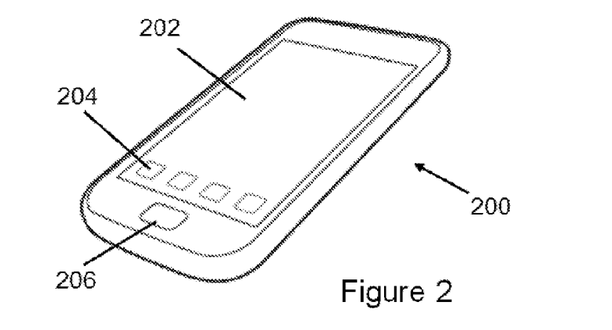
FIG. 2 shows an exemplary electronic device that includes a screen and control buttons.
Figure 3:
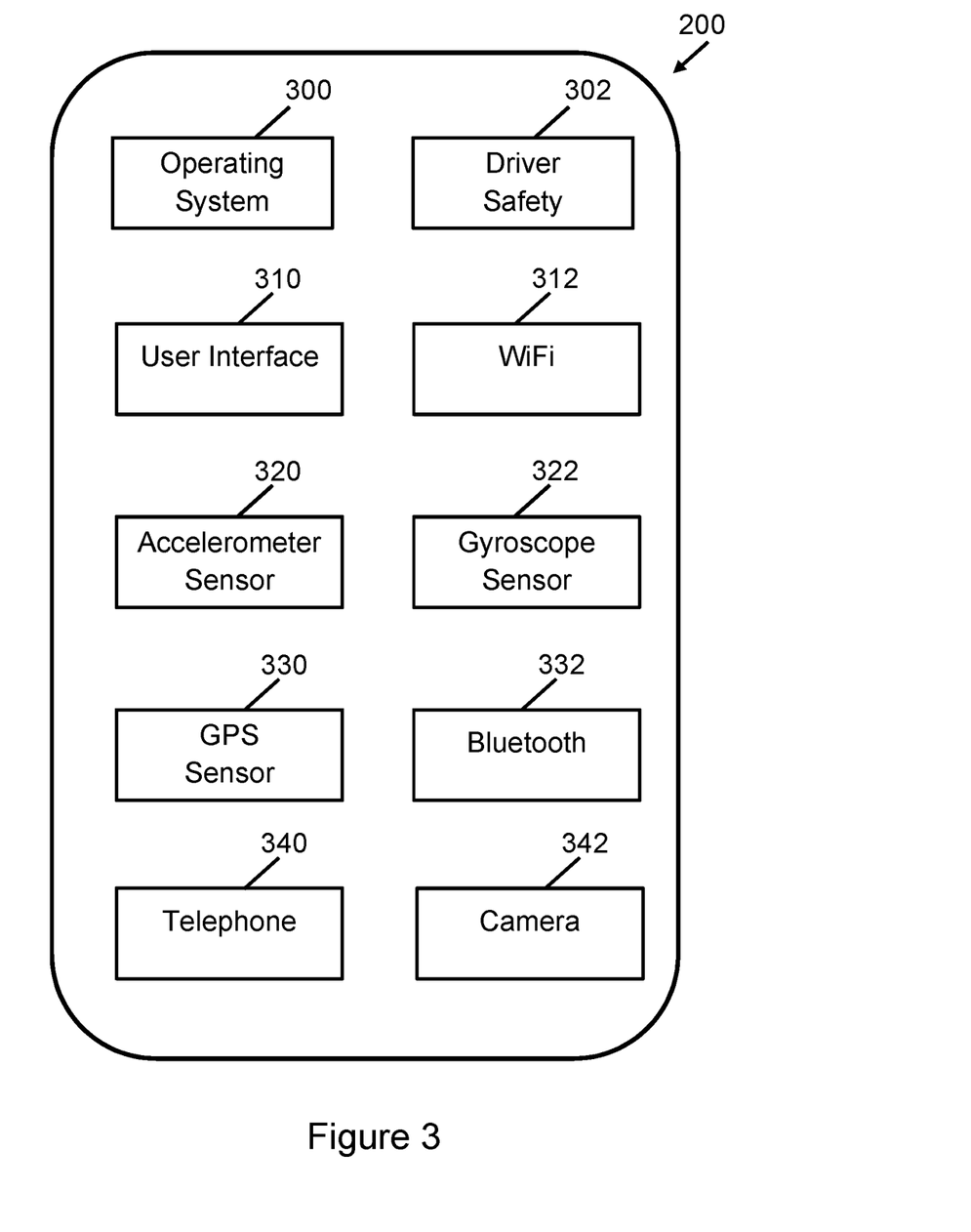
FIG. 3 illustrates example components for an example electronic device.

FIG. 2 shows an exemplary electronic device 200 that includes a screen 202 and control buttons. The control buttons include touchscreen controls 204 and physical controls 206. The control buttons 204, 206 allow a user to perform various functions using the electronic device 200 including, for example, making a telephone call, typing, texting, checking messages, etc. The electronic device 200 also includes various electronic components, for example processors, sensors, memories, transmitters, receivers, etc. FIG. 3 illustrates possible components for an example electronic device 200, including an operating system 300, a driver safety component 302, a user interface component 310, a WiFi (Wireless Fidelity) wireless networking component 312, an accelerometer sensor 320, a gyroscope sensor 322, a GPS sensor 330, a Bluetooth wireless component 332, a telephone component 340 and a camera 342. The device 200 can have more or less components or different components than those shown in FIG. 3. The driver safety component 302 can be resident on the electronic device 200, the vehicle 100, one of the beacons 110, 112, or divided between two or more of these locations.

One or both of the beacons 110, 112 and the components of the electronic device 200 can be used to precisely locate the electronic device 200 within the vehicle 100 and to determine if the electronic device 200 is being used in hands free mode. A component of the electronic device 200 can be used to determine the distance of the electronic device 200 from the beacon 110. For example, if the beacon 110 is a Bluetooth beacon, the Bluetooth component 332 of the electronic device 200 can be used to determine the distance to the beacon 110. The accelerometer sensor 320 and the gyroscope sensor 322 of the electronic device 200 can be used to determine if the electronic device 200 is being moved within the vehicle 100. The GPS sensor 330 of the electronic device 200 can be used to determine if the vehicle 100 is moving. The operating system 300 can report to the driver safety component 302, or the driver safety system 302 can directly determine, these sensor readings and if other functionality of the device 200 is being activated. Combining this information, the driver safety system 302 can determine if the driver is using the electronic device 200 while the vehicle 100 is moving and what functionality of the device 200 is being used. The placement of the beacon 110 near the driver's seat 108 and away from the passenger seat 118 enables the system to separate driver mobile device usage from passenger mobile device usage using the single beacon 110.

Figure 4:
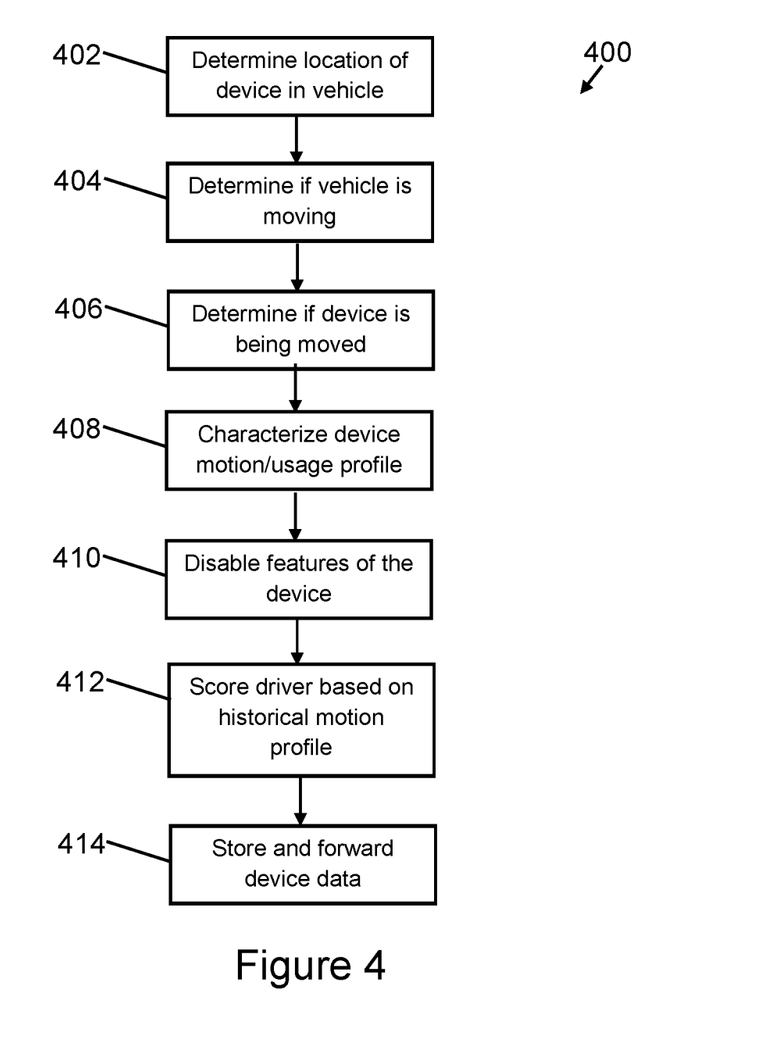
FIG. 4 illustrates an exemplary method for a vehicle safety system.

An exemplary control method 400 for a vehicle safety system is illustrated in FIG. 4. The following description will use the vehicle and devices illustrated in FIGS. 1-3 by way of example and not limitation. The driver safety component 302 and control flow 400 can be resident on the electronic device 200, the vehicle 100, one of the beacons 110, 112 or divided between two or more of these locations. The following exemplary description uses the beacon 110 of FIG. 1, but can easily be expanded to include one or more additional beacons, such as beacon 112, or a beacon in another location.

The beacon 110 can be registered with the device 200 and the driver safety method can be manually or automatically activated when the device 200 comes into close proximity of the beacon 110. This can take place similar to how an electronic device can be registered with an automobile Bluetooth system, and then will be recognized for hands free functions when in close proximity of the automobile.

At block 402, the driver safety system determines the location of the electronic device 200 in the vehicle 100. The beacon 110 can be a Bluetooth Low Energy (BLE) beacon that is located near the driver seat 108 between the driver side door jamb 106 and the steering column 104 of the vehicle 100. The Bluetooth component 322 on the electronic device 200 can calculate the distance to the beacon 110. The driver safety system can separate distances into multiple categories: for example, immediate, near, far and unknown. As an example, the immediate category can include distances of less than 1 meter, the near category can include distances from 1 to 10 meters, the far category can include distances from 10 to 50 meters, and the unknown category can include distances greater than 50 meters. The distance between the device 200 and the beacon 110 can be used to determine the location of the device 200 in the vehicle 100. Based on this location and/or category, the user of the device 200 can be classified as either Driver or Passenger. The immediate category can be used to represent the Driver and the near category can be used to represent a Passenger.

At block 404, the driver safety system determines if the device 200 is in a vehicle 100 that is moving. Many electronic devices and vehicles come equipped with GPS (Global Positioning System) sensors that can be used to determine current location as well as speed. The GPS sensor 330 of the device 200 can be used to determine if the device 200 is in a moving vehicle. The GPS sensor data indicates the speed at which the device 200 is traveling. Any speed above zero indicates that the device 200 is moving. When combined with the beacon detection determined at block 402, the driver safety system can determine where the device 200 is in the vehicle 100 and whether that vehicle 100 is moving.

At block 406, the driver safety system determines if the device 200 is being moved within the vehicle 100. Many electronic devices come equipped with three-dimensional accelerometer and gyroscope sensors that can be used to determine if the device is being moved. The accelerometer and gyroscope sensors 320, 322 of the device 200 can be used to determine if the device 200 is being moved. An exemplary method for detecting motion is to use six data points: Accelerometer X value ($A_x$), Accelerometer Y value ($A_y$), and Accelerometer Z value ($A_z$) from the accelerometer sensor 320; and Gyroscope X value ($G_x$), Gyroscope Y value ($G_y$), and Gyroscope Z value ($G_z$) from the gyroscope sensor 322. The individual sensor readings fluctuate slightly over time; however, when treated as a vector, large changes indicate movement of the device 200. A gross movement vector (v) for the device 200 can be calculated as:

$$v = \text{Square Root } (A_x^2 + A_y^2 + A_z^2 + G_x^2 + G_y^2 + G_z^2)$$

The device accelerometer and gyroscope sensors 320, 322 typically report these values several times per second and indicate changes in acceleration and rotation of the device 200. A MINIMUM_THRESHOLD value can be used to eliminate minor fluctuations in the gross movement vector v. When the calculated value of the vector v is above the MINIMUM_THRESHOLD, the driver safety system can determine that the device 200 is being moved.

At block 408, the driver safety system characterizes a motion and/or usage profile of the device 200. The motion detection of device 200 at block 406 detects gross movement of the device 200, and each of these device movements can be further classified by examining the trends in the sensor data and other information. For example, when the accelerometer vector ($A_x$, $A_y$, $A_z$) shows large changes, but the gyroscope vector ($G_x$, $G_y$, $G_z$) shows little or no changes, the system could determine that the device 200 is being picked up, as evidenced by the rapid acceleration. Whereas, if the accelerometer vector shows little or no changes, but the gyroscope vector shows large changes, the system could determine that the device 200 is being tapped on, as evidenced by the slight twisting motion caused by the tapping. The driver safety system can categorize and catalog the motions and usages of the device 200 into a "motion/usage profile". This motion/usage profile can include but is not limited to the following types of device motions and usages, which are each described with an example of how they can be detected:

Picking up—The device was picked up from a resting position
    accelerometer vector shows large changes, gyroscope vector shows small changes, altitude increases Putting down—the device was put down after being in use
    accelerometer vector shows large changes, gyroscope vector shows small changes, altitude decreases Typing—the device is being used to type in an application (Email, notes, etc.)
    accelerometer vector shows small changes, gyroscope vector shows large changes and/or detection by operating system 300

Swiping—user is using his/her finger to swipe content on the screen 202 of the mobile device 200. The swiping motion is typically either left-to-right or right-to-left, but could also be top-to-bottom or bottom-to-top or combinations thereof.
    swiping motion can be detected by the operating system 300 of the mobile device 200. For example, the user interface component 310 can detect and report activation of a screen touch subsystem monitoring user touching the screen 202; these events can include tap, double-tap, pinch-zoom, scroll up/down and others.

Zooming—user is using his/her fingers to zoom in or out content on the screen 202.
    zoom motion can be detected and reported by the operating system 300 and/or user interface component 310, as explained above.

Taking picture—user is taking a picture using the camera 342 on the device 200.
    if the device 200 has a camera 342, activation of the camera 342 can be detected and reported by the operating system 300 and/or camera component 342.

Making phone call—user is making a call using the telephone 340 on the device 200.
    if the device 200 has a telephone 340, activation of the telephone 340 can be detected and reported by the operating system 300 and/or telephone component 340.

Making phone call with in hands-free mode—user is making a telephone call with the device using a hands-free mode/device
    hands-free mode can be detected by the operating system 300 on the mobile device 200; for example, the Bluetooth component 332 and accessibility subsystems on the device 200 and vehicle 100 can report when a Bluetooth hands-free device is in use.

The sensor readings, detected functionality activation or usage, and other relevant information of the device 200 can be received directly by the driver safety system or reported to the driver safety system by the operating system 300 or other component of the device 200.

The types of motions characterized by the system can be customized by using a combination of sensor values and rules. This extensible system allows operators of the system to change the motion and usage profile settings based on the policies being enforced. For example, if the system is deployed using devices that utilize a bar-code scanner, the operator could define a motion profile for the scanning motion. This profile could be used for monitoring package delivery drivers who are scanning packages while driving. Each motion profile can define which sensors and applications are being used and which values are required to satisfy the motion/usage profile.

Figures 5, 6:
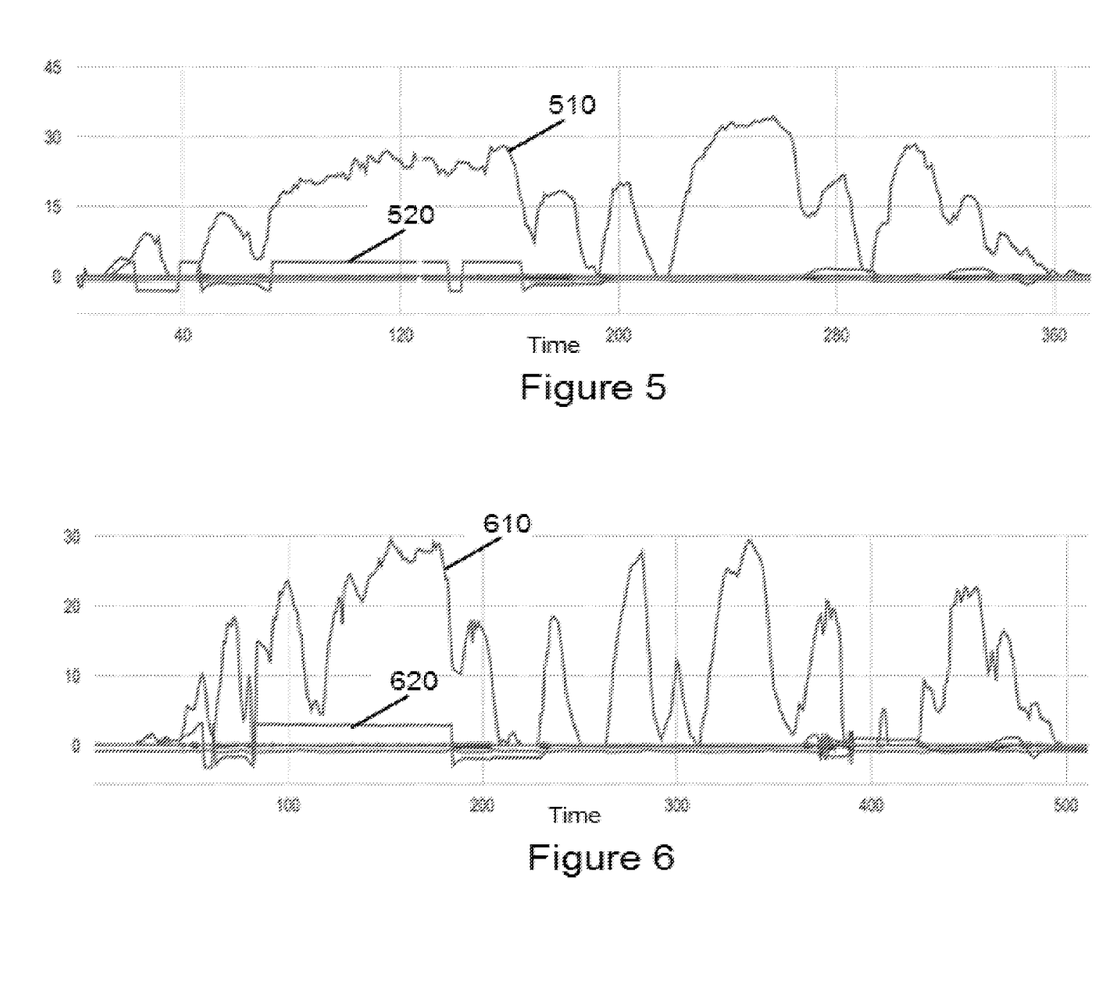
FIG. 5 shows the sensor data for a scenario where the device is in a vehicle that is moving but has not been picked up.
FIG. 6 shows the sensor data for a scenario where the device is in a vehicle that is moving and has been picked up once.

FIG. 5 shows example sensor data for a scenario where the device is in a vehicle that is moving but has not been picked up. In FIG. 5, the speed of the vehicle is indicated by a speed line 510, and the forward movement of the vehicle shows some movement of the gyroscope X value ($G_x$) indicated on a gyroscope-X line 520. FIG. 5 also shows the gyroscope Y and Z values ($G_y$ and $G_z$), the roll, pitch and yaw values, and the gross movement vector v which all remain fairly stable around a zero Y-value. The roll, pitch and yaw values can be computed from the gyroscope and accelerometer values used in computing the gross movement vector v. Random jitter of these values over time can be due to vibration in the car due to road conditions, i.e. bumps, uneven pavement, turns, etc.

FIG. 6 shows example sensor data for a scenario where the device is in a vehicle that is moving and has been picked up once. In FIG. 6, the speed of the vehicle is indicated by a speed line 610, and the forward movement of the vehicle shows some movement of the gyroscope X value ($G_x$) indicated on a gyroscope-X line 620. FIG. 6 also shows the gyroscope Y and Z values, the roll, pitch and yaw values, and the gross movement vector v which all remain fairly stable around a zero Y-value except during the pick-up event. The gyroscope and accelerometer values and the gross movement vector v, which is a function of those values, all move simultaneously during the pick-up event which occurs just before time 400 on the x-axis. The simultaneous movement of the gyroscope and accelerometer values due to the pickup of the mobile device causes the gross movement vector v (defined above) to exceed a threshold amount, which can indicate to the system that a mobile device pick-up event has occurred.

At block 410, the driver safety system can disable one or more features on the device 200. On some device platforms, application developers are permitted to customize and even disable certain features of the platform. For example, on Google's Android operating system, a developer can implement code that listens for incoming text messages and prevents the user from seeing those messages while in a moving vehicle. This may be beneficial for a driver, but not for a passenger of the vehicle. Feature disablement can include, but is not limited to, sending and receiving text messages, sending and receiving e-mails, accessing the Internet via Web browser, and placing and receiving telephone calls.

Feature disablement can be accomplished by monitoring the list of current applications that are running on the device 200, and comparing this list against all applications that the system is authorized to block (text messaging, e-mail, web browser, phone, etc.). If the system has determined the device 200 is in a moving vehicle 100 (Block 404), and the device 200 is in close proximity to the driver (Block 402), then the driver safety system can intercept any attempts to access an application that the system is authorized to block. The driver safety system can also allow a user to predetermine a reply message, for example a predetermined voice message for an incoming telephone call or a predetermined text reply to an incoming text message. This predetermined reply message can be sent by the driver safety system when it determines that the requested application should be blocked because the user is driving. For example, if the user of the device is driving and receives a text message, the driver safety system can send a predetermined text reply message back to the sender of the message such as "Sorry, I can't reply to you right now since I am driving."

At block 412, the driver safety system can award points or score a driver based on his/her historical motion/usage profile data. As motion/usage data is captured over time, a pattern of a user's behavior with his/her mobile device starts to emerge. By assigning points or scores to each of the motion/usage profile categories, a user's behavior can be quantified. For example, Typing on the device 200 might be given a relatively high score compared to Picking Up the device 200, since Typing may be considered "worse" than Picking Up. The driver safety system can have a scoring system that allows a user's motion/usage profile to be scored over several time periods: for example one day, one week, one month, one year, etc. These scores can be used to track a user's behavior and compare against other users. In aggregate, these scores can also be used to create a safe driving guideline. For example, a score of 5 Typing in one day might indicate an unsafe motion/usage profile. The table below illustrates one possible implementation of a driver safety scoring system:

| Event | Description | Points |
| --- | --- | --- |
| Pick up | user picked up device | 5 |
| Phone call | user made phone call with device | 10 |
| Typing | user typed on device | 25 |
| E-mail | user accessed E-mail app on device | 50 |
| Text Messaging | user accessed Text Messaging app on device | 50 |
| Browser | user accessed Web Browser app on device | 25 |
| Camera | user accessed Camera app on device | 25 |

The table above shows an exemplary implementation of a driver safety scoring system. The scoring system for the motion data can be customized by an administrator or operator based on the policies being enforced. The points assigned for each violation can be defined accordingly. For example, if an administrator determines that using E-mail while driving is an important action to prevent, relatively more points can be assigned to the E-mail motion. Likewise, if using the Camera is considered less important, then relatively fewer points can be assigned to the Camera motion. By adjusting this scoring system, the administrator or operator can configure the system to match the policies being enforced.

At block 414, the driver safety system stores and/or forwards driver safety data from the mobile device 200 or the other device where the driver safety system is resident, for example the vehicle 100 or beacon 110. Driver safety data from the sensors and other components of the device 200 can be captured continuously while the device 200 is in the immediate proximity of the beacon 110 in the vehicle 100. This data can be cataloged and stored to properly detect device usage, detect motion, classify the motion/usage profile, and calculate the motion/usage profile score. A data collection system can cache this data locally and transmit the driver safety data to a remote server. The driver safety data can be captured in real-time in a local database. As an example, the driver safety data can include sensor data that is captured several times per second, and the captured sensor data can include:

Date/Time—a timestamp for the data
User ID—a unique identifier for the user
AccelerometerX—the X value of the accelerometer
AccelerometerY—the Y value of the accelerometer
AccelerometerZ—the Z value of the accelerometer
GyroscopeX—the X value of the gyroscope
GyroscopeY—the Y value of the gyroscope
GyroscopeZ—the Z value of the gyroscope
GPSLatitude—the latitude value of the GPS sensor
GPSLongitude—the longitude value of the GPS sensor
GPSAltitude—the altitude value of the GPS sensor
Speed—the velocity value of any number of sensors on the device (GPS, Cell Network calculated, Accelerometer, or Gyroscope)
Direction—the compass direction of the device If the device 200 allows monitoring and reporting of information regarding device usage and other relevant information, then this information can also be captured by the data collection system and transmitted to the remote server. At discreet times, the driver safety system can transmit the database containing the driver safety data to a remote server. Transmission of the driver safety data can be performed using industry standard practices such as web services and secure hypertext transport protocol (HTTPS) in order to keep the data secure.

Figure 7:
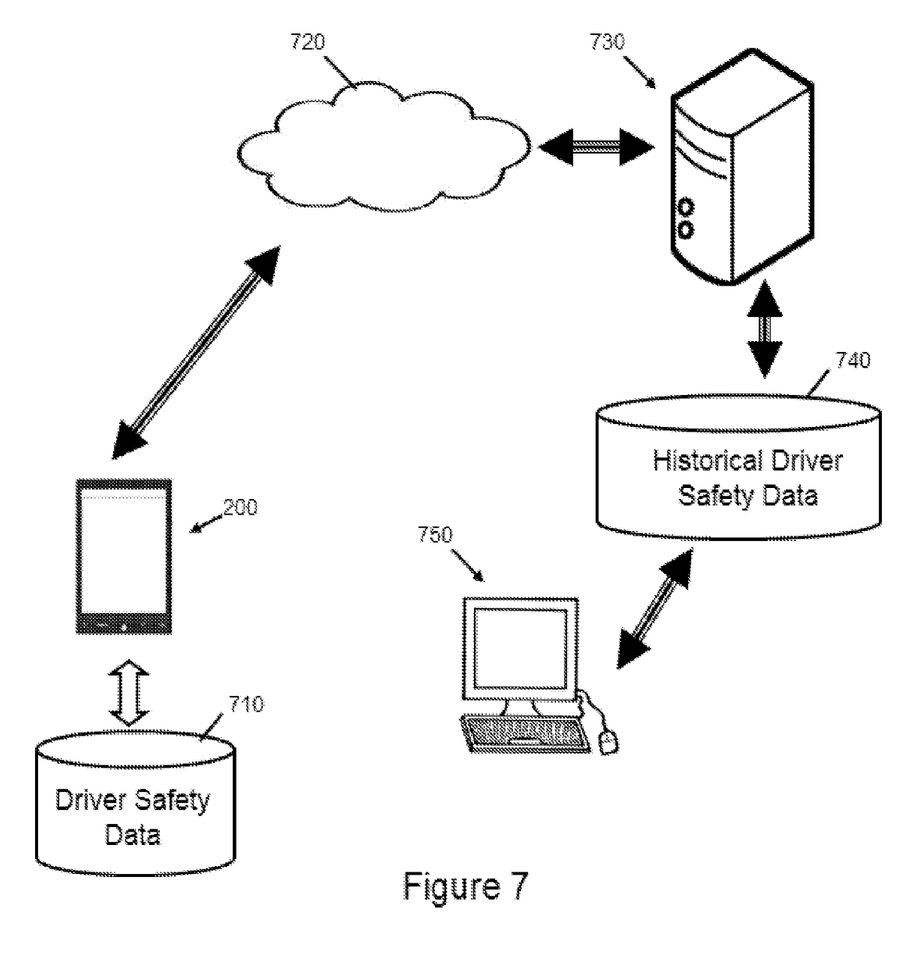
FIG. 7 illustrates an example of the driver safety system storing and forwarding sensor and/or motion profile data from the device to a server.

FIG. 7 illustrates an example of the driver safety system storing and forwarding driver safety data from the device 200 to a server. The driver safety data can include, for example, sensor data, motion/usage profile data and/or other relevant driver safety information. In this embodiment, the device 200 stores the driver safety data 710 locally in memory on the device 200. Then at some predetermined, periodic or other time basis, the device 200 transmits the driver safety data 710 over a network 720 to a server 730 or other computing system. The network 720 can be a local area network (LAN), wide area network (WAN), the Internet or other network. The server 730 stores the historical driver safety data in a database 740 that can be accessed locally or remotely by a computer system 750, or possibly the electronic device 200.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A vehicle safety system that controls usage of a mobile device in a vehicle, the vehicle safety system comprising:
   an electronic beacon located in the vehicle, the electronic beacon transmits a location signal;
   a proximity sensor that generates device location data using the location signal, the device location data monitors location of the mobile device in the vehicle;
   a movement sensor that detects movement of the vehicle or the mobile device, and that generates movement data;
   a processor that receives the device location data and the movement data, that determines a distance between the mobile device and the electronic beacon using the device location data; the processor further determines whether the mobile device is being used by a driver of the vehicle using the distance between the mobile device and the electronic beacon, and determines whether the vehicle is moving using the movement data;
   wherein the processor monitors usage of the mobile device based on whether the mobile device is being used by the driver of the vehicle while the vehicle is moving.

2. The vehicle safety system of claim 1, wherein the processor limits usage of the mobile device based on whether the mobile device is being used by the driver of the vehicle while the vehicle is moving.

3. The vehicle safety system of claim 1, wherein the electronic beacon is a Bluetooth beacon that transmits a Bluetooth signal; and
   the proximity sensor is a Bluetooth component on the mobile device that detects the Bluetooth signal of the electronic beacon.

4. The vehicle safety system of claim 1, wherein the motion sensor is a GPS sensor on the mobile device that detects movement of the mobile device.

5. The vehicle safety system of claim 1, wherein the electronic beacon is located in the vehicle between a steering column and a driver-side door jamb.

6. The vehicle safety system of claim 1, further comprising:
   a device usage monitor that detects functionality of the mobile device being used, and that generates functionality data that indicates what functionality of the mobile device is currently being used;
   an enforcement list of mobile device functionality to be limited by the vehicle safety system when the mobile device is being used by the driver of the vehicle while the vehicle is moving;
   wherein the processor receives the functionality data, determines if any functionality of the mobile device currently being used is on the enforcement list, and if any functionality of the mobile device currently being used is on the enforcement list then the processor limits that functionality of the mobile device according to the enforcement list.

7. The vehicle safety system of claim 6, further comprising:
   device motion sensors that detect motion of the mobile device in the vehicle, and that generate device motion data;
   wherein the processor receives the device motion data and determines whether the driver of the vehicle is moving the mobile device using the device location data and the device motion data;
   wherein the processor limits usage of the mobile device based on whether the mobile device is being used by the driver of the vehicle while the vehicle is moving and whether the driver of the vehicle is moving the mobile device while the vehicle is moving.

8. The vehicle safety system of claim 7, wherein the device motion sensors are an accelerometer sensor and a gyroscope sensor on the mobile device.

9. The vehicle safety system of claim 7, wherein the processor determines a device motion/usage profile using the device motion data and the functionality data.

10. The vehicle safety system of claim 9, wherein at selected upload times the processor transmits the device location data, the movement data, the functionality data, the device motion data and the device motion/usage profile to a server.

11. A vehicle safety method for controlling usage of a mobile device in a vehicle, the vehicle safety method comprising:
    transmitting a location signal using a first electronic beacon located in the vehicle;
    using a wireless receiver on the mobile device to receive the location signal;
    determining a distance between the mobile device and the first electronic beacon using the location signal;
    determining whether the distance between the mobile device and the first electronic beacon locates the mobile device at a driver's seat or at a passenger seat in the vehicle;
    generating device location data indicating the location of the mobile device in the vehicle;
    generating vehicle movement data indicating whether the vehicle is moving;
    determining whether the mobile device is being used by a driver of the vehicle based on the device location data and the distance between the mobile device and the first electronic beacon; and
    monitoring usage of the mobile device based on whether the mobile device is being used by the driver of the vehicle while the vehicle is moving.

12. The vehicle safety method of claim 11, further comprising:
    limiting usage of the mobile device based on whether the mobile device is being used by the driver of the vehicle while the vehicle is moving.

13. The vehicle safety method of claim 12,
    transmitting location signals using a plurality of electronic beacons located in the vehicle, the first electronic beacon being one of the plurality of electronic beacons;
    using the wireless receiver on the mobile device to receive location signals from the plurality of electronic beacons located in the vehicle;
    determining a distance between the mobile device and each of the plurality of electronic beacons using the location signals;
    determining whether the distances between the mobile device and each of the plurality of electronic beacons locates the mobile device at a driver's seat or at a passenger seat in the vehicle; and
    determining a device location using the distances between the mobile device and each of the plurality of electronic beacons.

14. The vehicle safety method of claim 12, further comprising:
    monitoring activation and usage of functionality of the mobile device;

generating device functionality data indicating activation and usage of functionality of the mobile device;

maintaining an enforcement list of mobile device functionality to be limited when the mobile device is being used by the driver of the vehicle while the vehicle is moving;

determining if any functionality of the mobile device that is on the enforcement list is attempting to activate, and if any functionality of the mobile device on the enforcement list is attempting to activate, limiting or disabling activation of that functionality of the mobile device according to the enforcement list.

15. The vehicle safety method of claim 14, wherein text messaging is on the enforcement list, the vehicle safety method further comprising:

allowing a user to edit a default response text message to be sent in response to any text message received by the user while the user is driving the vehicle and the vehicle is moving;

detecting receipt of a text message on the mobile device of the user;

automatically sending the default response text message in response to the received text message received by the user if the user is driving the vehicle and the vehicle is moving.

16. The vehicle safety method of claim 14, further comprising:

generating device motion data indicating motion of the mobile device in the vehicle;

determining whether the driver of the vehicle is moving the mobile device;

generating a device motion/usage profile indicating usage of the mobile device by the driver based on the functionality data and the device motion data.

17. The vehicle safety method of claim 16, wherein generating device motion data comprises:

monitoring accelerometer outputs of an accelerometer sensor on the mobile device;

monitoring gyroscope outputs of a gyroscope sensor on the mobile device;

computing a gross movement vector based on the accelerometer outputs and the gyroscope outputs; and determining motion of the mobile device in the vehicle based on the difference between the gross movement vector and a minimum movement threshold.

18. The vehicle safety method of claim 16, further comprising:

scoring the driver of the vehicle based on the device motion/usage profile while the driver is driving the vehicle.

19. The vehicle safety method of claim 18, further comprising:

uploading the device location data, the vehicle movement data, the functionality data, the device motion data and the device motion/usage profile to a server.

20. The vehicle safety method of claim 18, further comprising:

allowing an administrator to customize the enforcement list of mobile device functionality to be limited when the mobile device is being used by the driver of the vehicle while the vehicle is moving.

* * * * *